Oct. 23, 1923.
R. W. McLEAN
SAW GUMMING MACHINE
Filed July 26, 1922   10 Sheets-Sheet 3
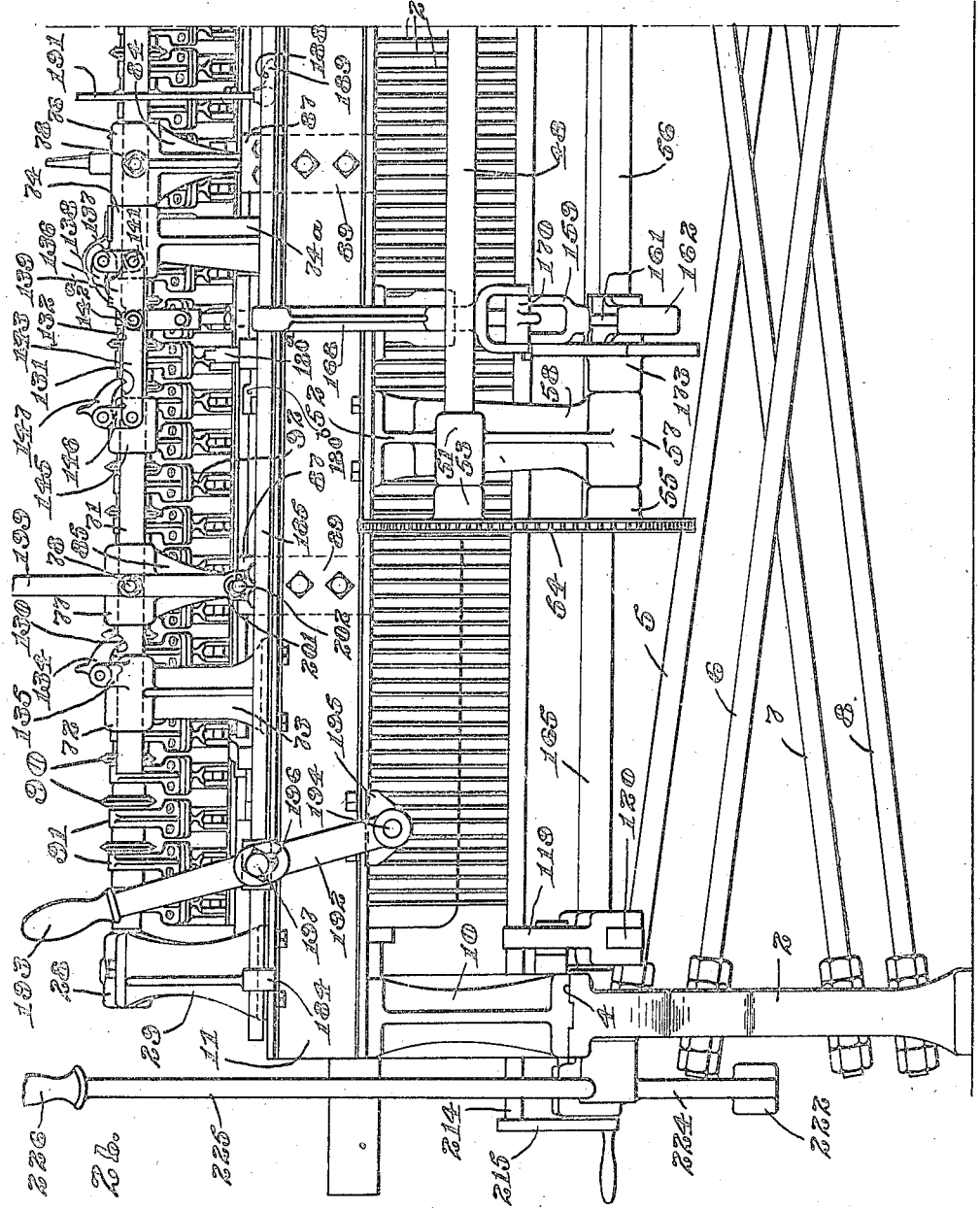

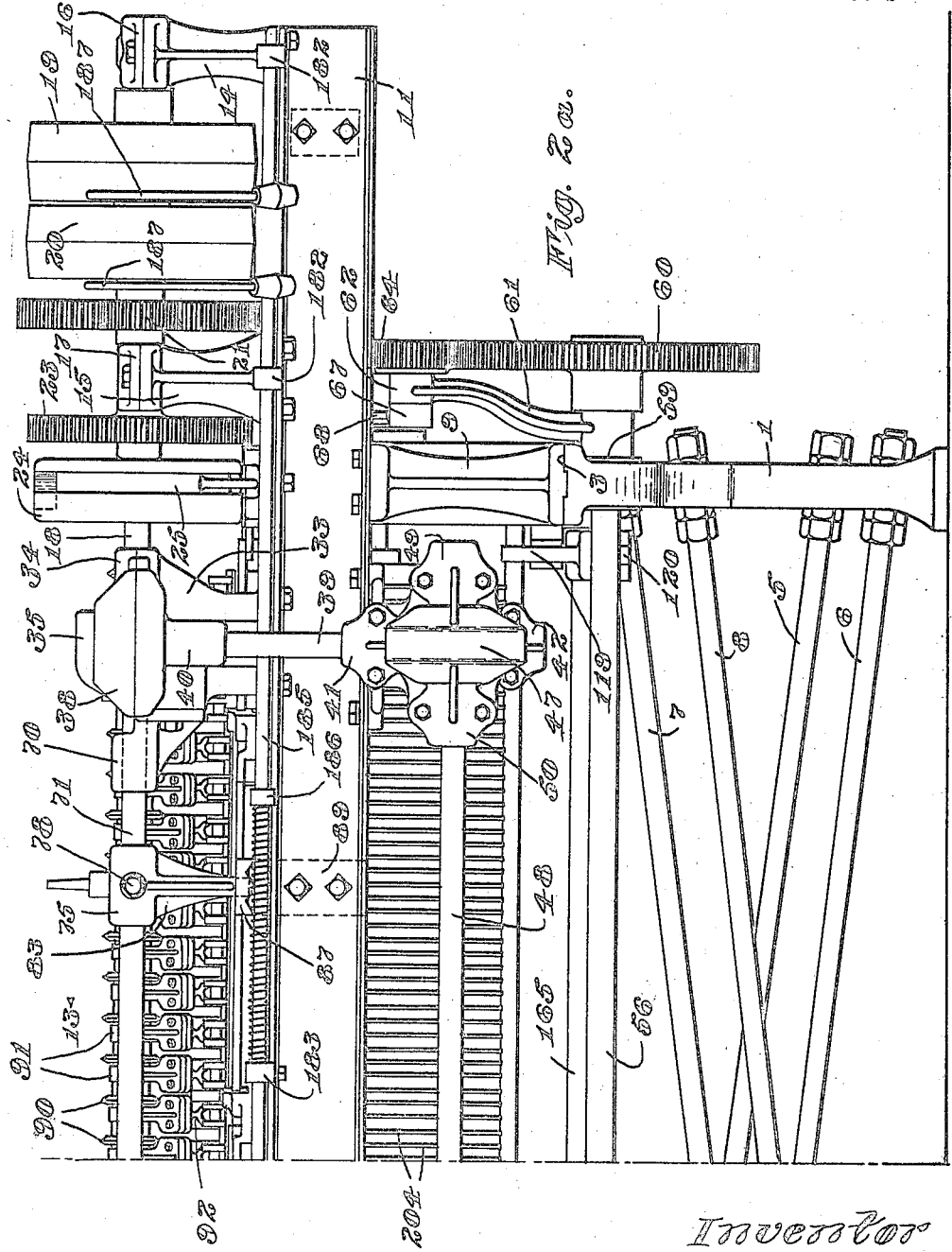

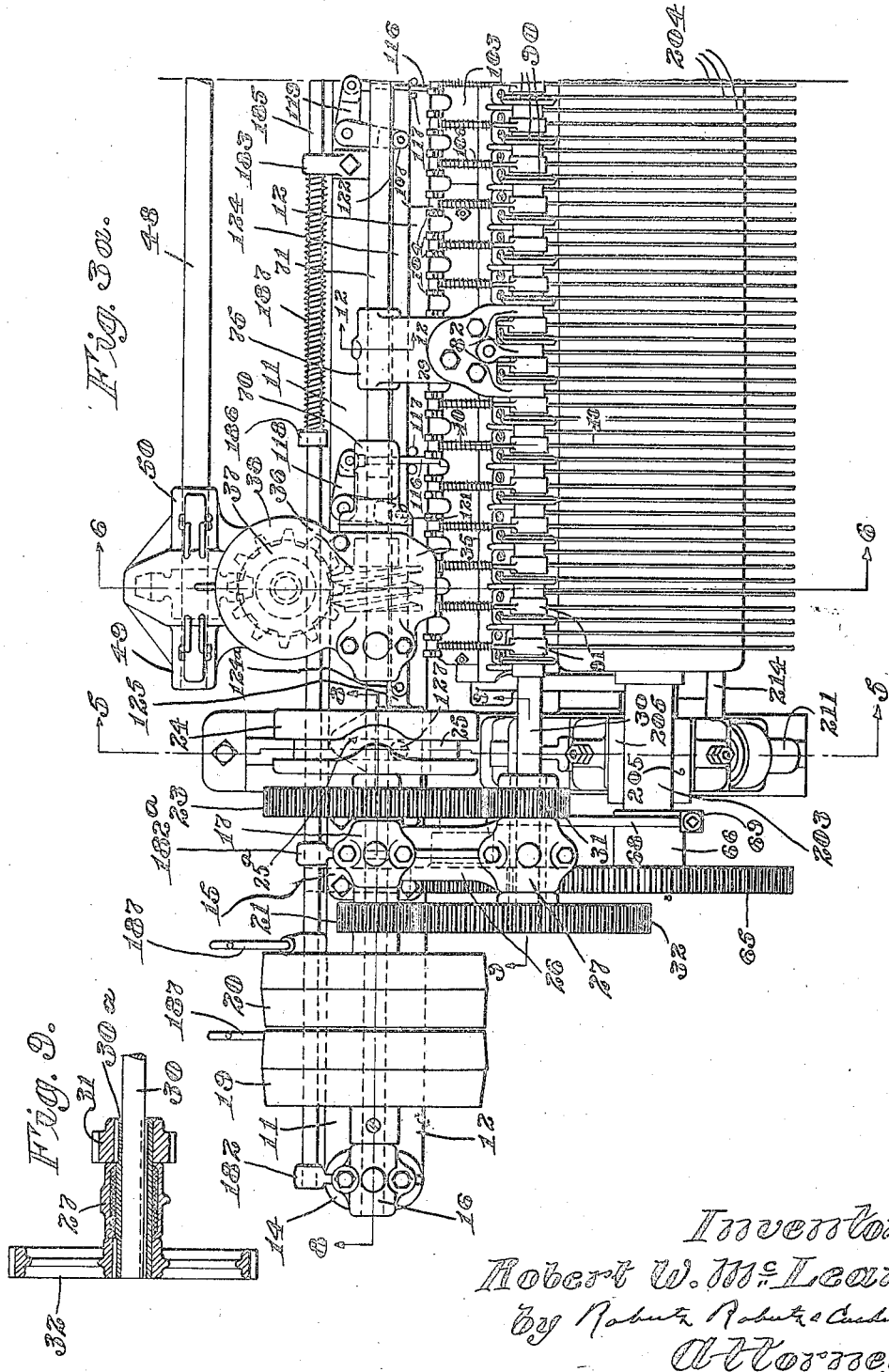

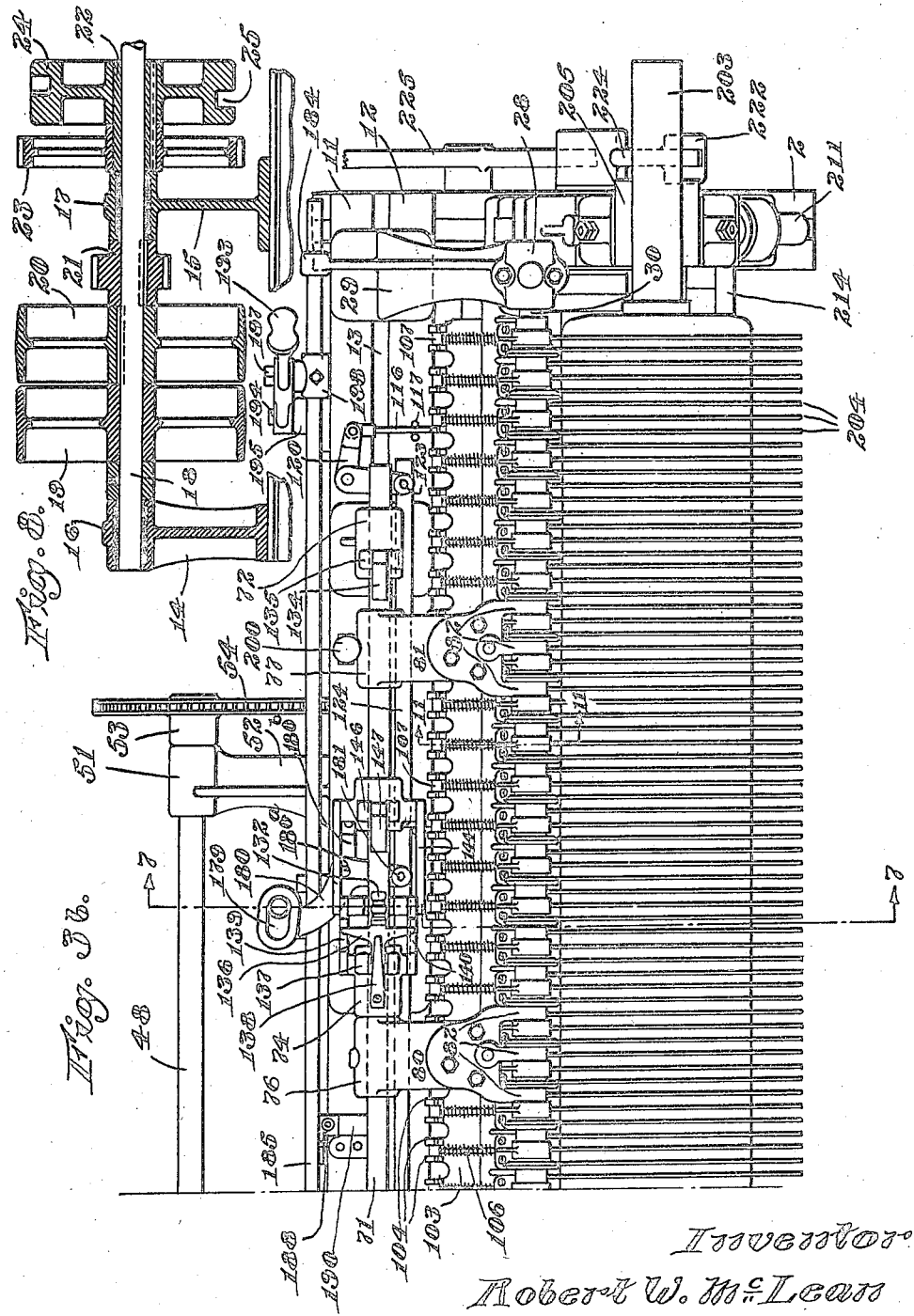

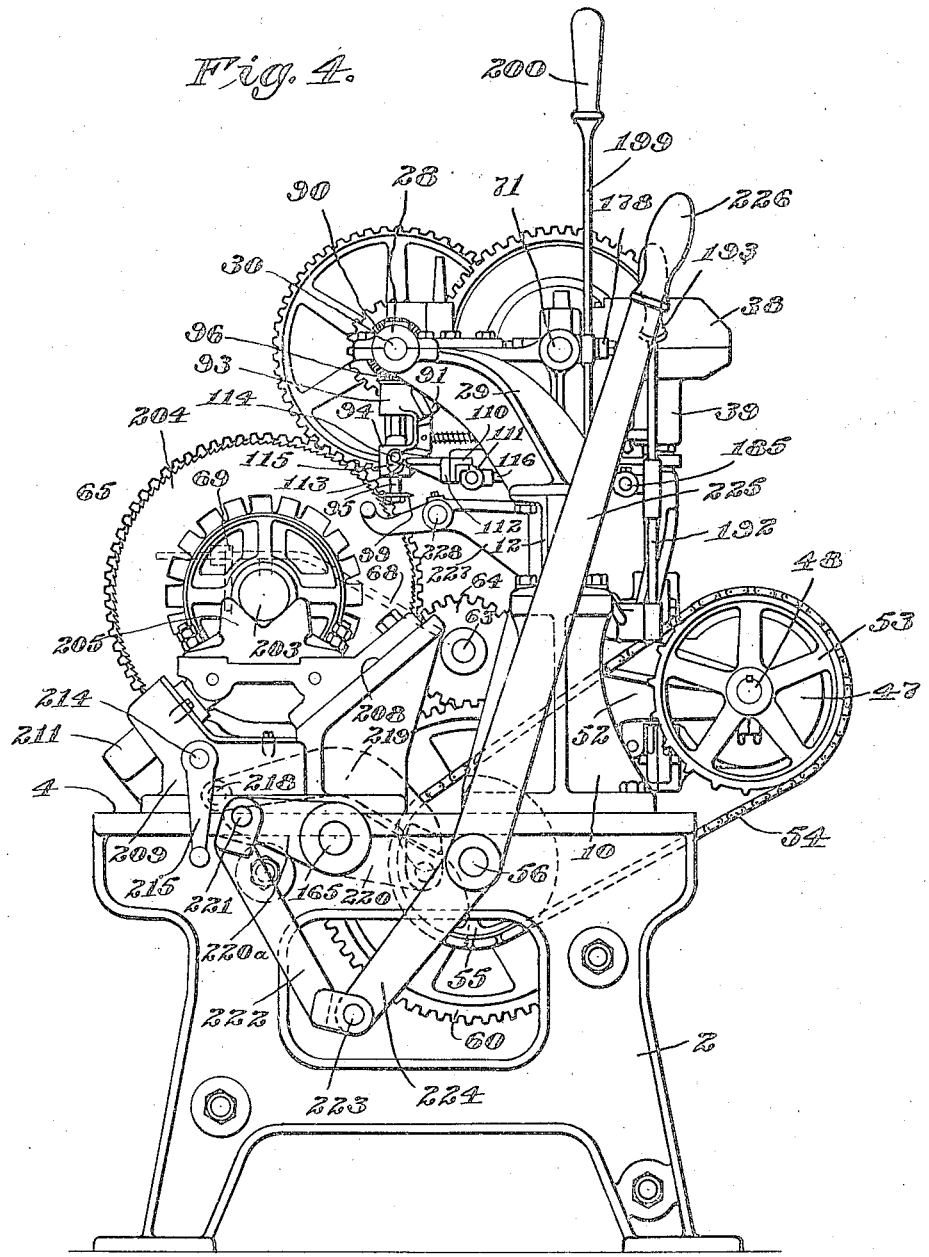

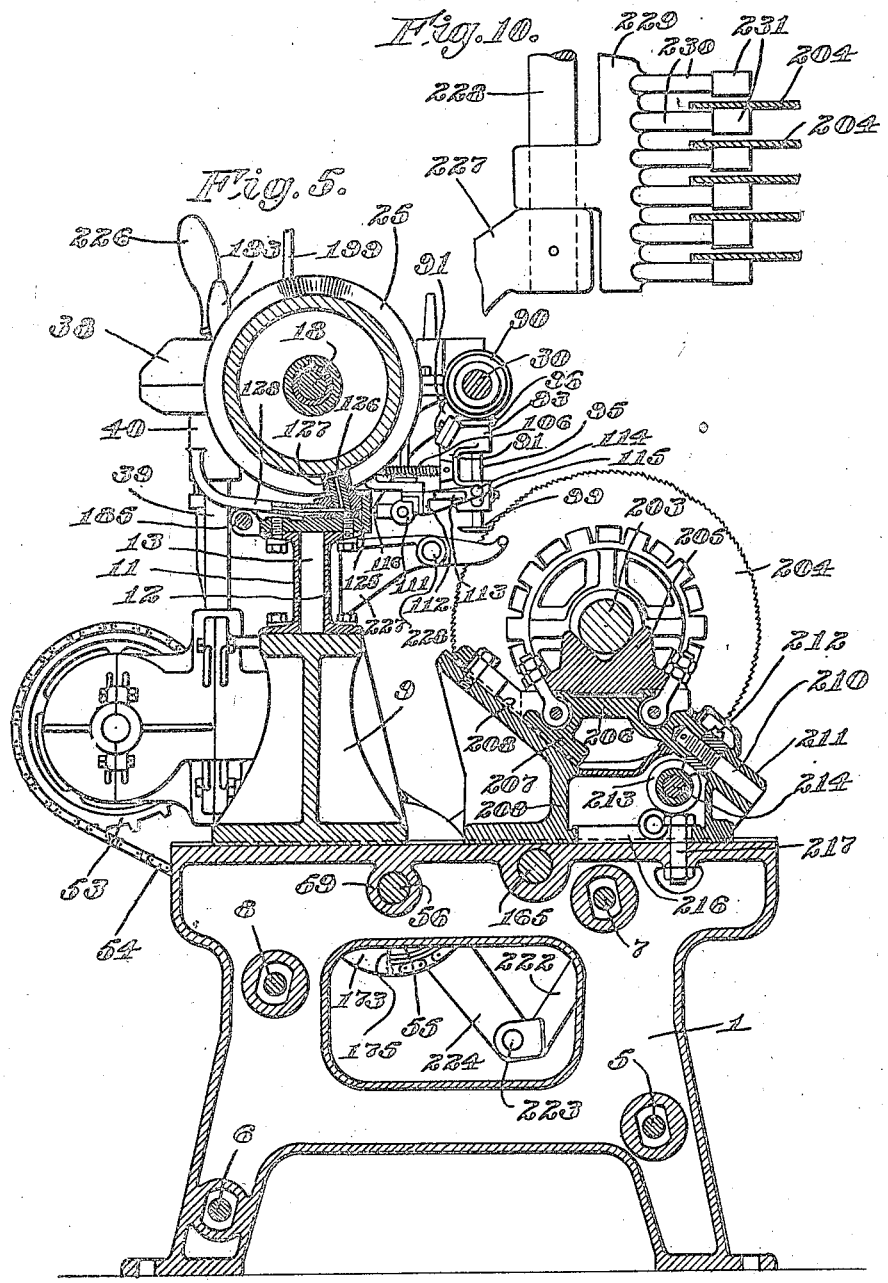

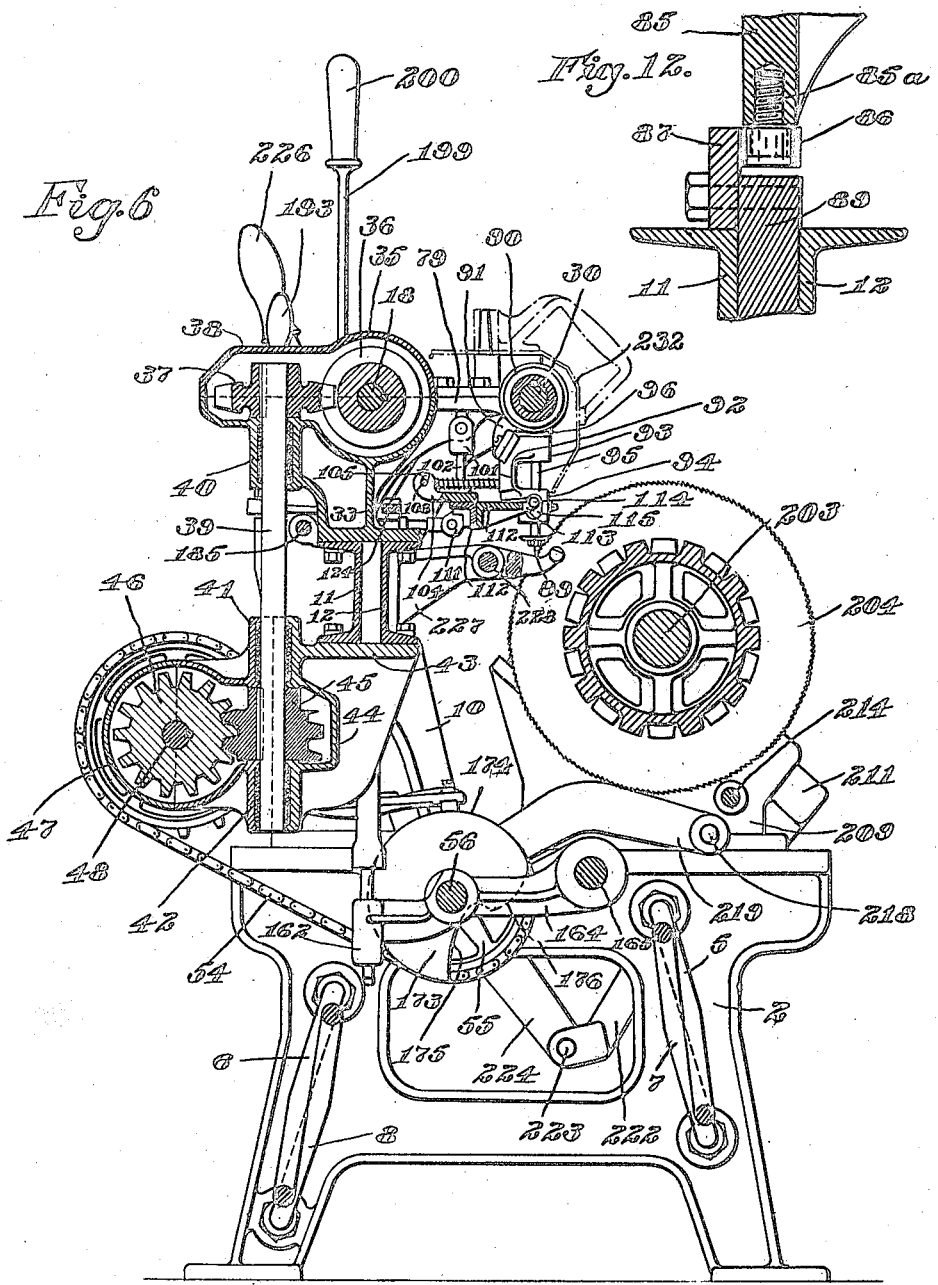

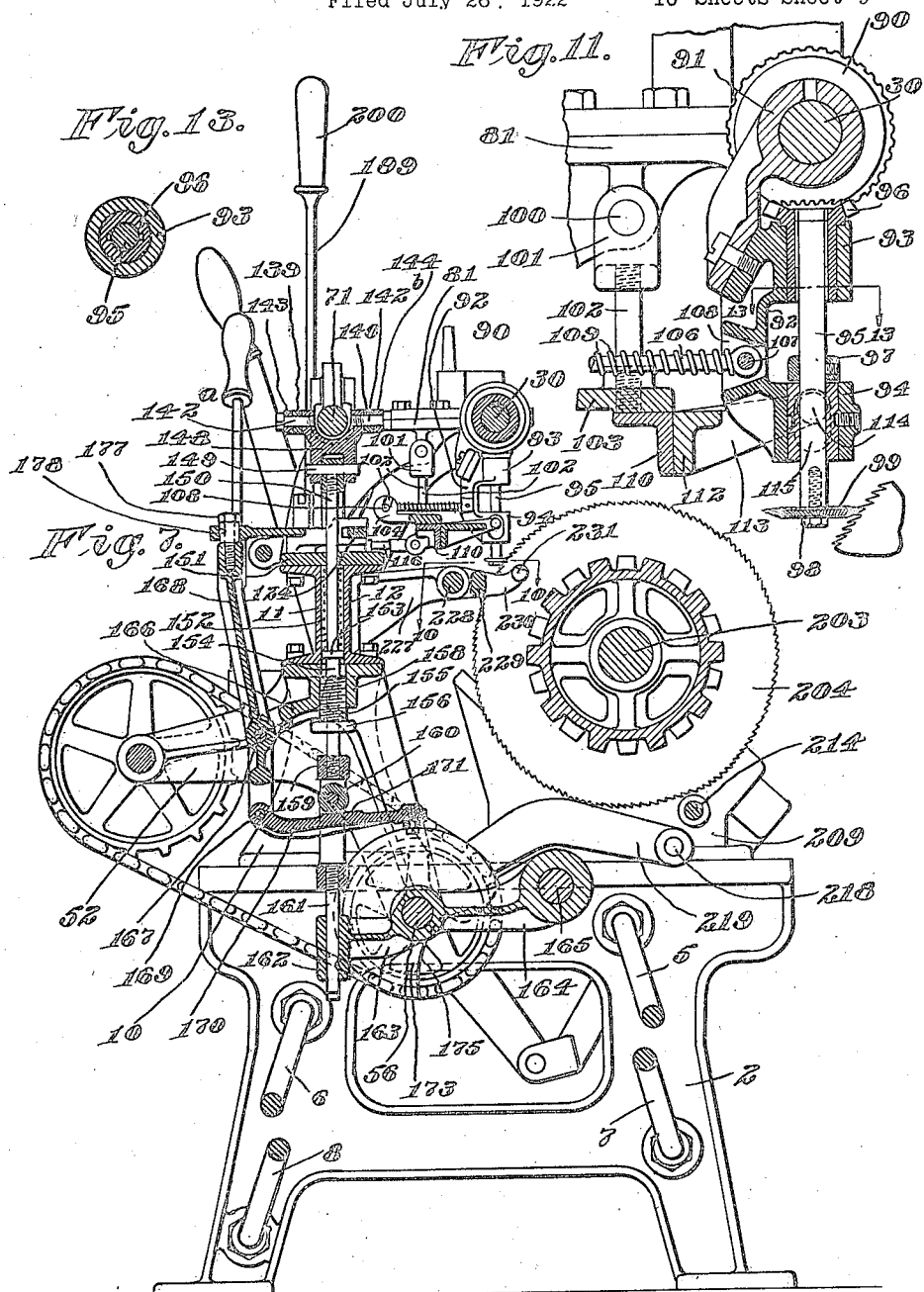

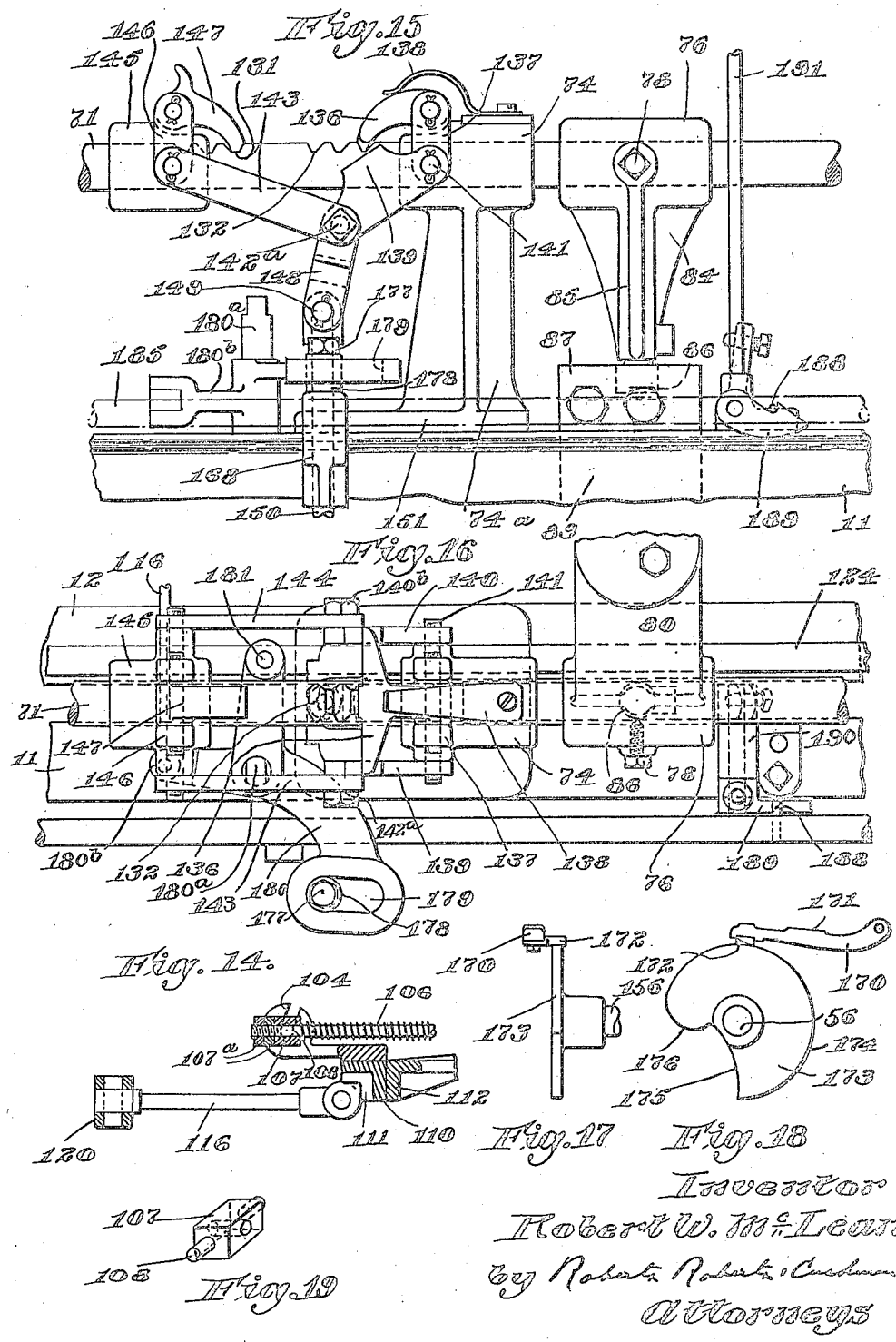

Patented Oct. 23, 1923.

1,472,013

UNITED STATES PATENT OFFICE.

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

SAW-GUMMING MACHINE.

Application filed July 26, 1922. Serial No. 577,577.

*To all whom it may concern:*

Be it known that I, ROBERT W. MCLEAN, a citizen of the United States of America, and resident of Bridgewater, in the county of Plymouth and State of Massachusetts, have invented new and useful Improvements in Saw-Gumming Machines, of which the following is a specification.

This invention concerns saw gumming machines and relates more particularly to machines for gumming the teeth of gin saws by means of rotating disk files.

When a cotton gin is working at full capacity, it is necessary to gum the saw teeth at frequent intervals, but unless extra saw cylinders are provided, the gin must stand idle during the gumming operation, and as it is not ordinarily feasible to provide the requisite number of extra saws, it is manifestly desirable, so far as possible, to reduce the time consumed in the gumming of the saws. Although mechanical means have heretofore been devised for carrying out the gumming operation and have been more or less successful for the intended purpose, they have not, so far as is known, been capable of reducing the time consumed in the gumming operation to the desired extent, and furthermore, in many cases, are of complicated and delicate construction, or require almost constant supervision. The workmen available in ginning mills are not ordinarily possessed of high mechanical skill nor can they usually be relied upon to supervise the operation of the ordinary gumming machine with the requisite care, so that complex mechanisms, requiring many and accurate adjustments find little favor with the trade, and on the other hand, those devices which, though of simpler form, necessitate constant supervision for their proper operation, frequently fail to give adequate service, or actually damage the saws by reason of the unreliability of the human element involved.

The principal object of the present invention is accordingly to provide a gumming machine for gin saws which is fully automatic in operation and capable of rapidly completing the entire operation of gumming the saws of a saw cylinder after once being set in motion; which will stop automatically at the completion of the gumming operation; which can be set up for operation upon a fresh saw cylinder with a minimum expenditure of time and trouble; and which is of relatively simple design, durable construction and capable of operation by relatively unskilled labor.

Further objects are to provide for the ready removal of individual files for replacement; to permit of the withdrawal of the saw cylinder from the files, if it be desired to do so during the gumming operation and its restoration to operative position while maintaining the angular relation of the saws to the files unchanged; to provide for the accurate entrance of the files into the tooth spaces while opposing any tendency of the files to bite too deeply, with consequent damage to the saws; and to provide for accurately and positively moving the saw cylinder into operative position and for holding it securely in such position after being brought into operative relationship to the files.

In the accompanying drawings there is illustrated by way of example, one specific form of mechanism which well exemplifies the various mechanical arrangements of parts by means of which the above objects might be attained.

Fig. 1 is a side elevation of the machine, viewed from the left side thereof;

Figs. 2ª and 2ᵇ are rear elevations of the left and right hand portions of the machine, respectively;

Figs. 3ª and 3ᵇ are plan views of the left and right hand portions of the machine respectively;

Fig. 4 is an elevation of the right hand side of the machine;

Fig. 5 is a vertical, transverse cross section on a line such as 5—5 of Fig. 3ª;

Fig. 6 is a similar cross section on the line 6—6 of Fig. 3ª;

Fig. 7 is a similar cross section on the line 7—7 of Fig. 3ᵇ;

Fig. 8 is a fragmentary longitudinal cross section on the line 8—8 of Fig. 3ª;

Fig. 9 is a fragmentary longitudinal cross section on the line 9—9 of Fig. 3ª;

Fig. 10 is a fragmentary plan view, partly in section, showing details of the means for supporting the saws against the lateral thrust of the files.

Fig. 11 is a fragmentary, vertical cross section on the line 11—11 of Fig. 3ᵇ;

Fig. 12 is a fragmentary cross section on the line 12—12 of Fig. 3ᵃ.

Fig. 13 is a transverse cross section on the line 13—13 of Fig. 11;

Fig. 14 is a fragmentary section, on the plane of Fig. 11, showing the rear portion of the mechanism of said figure;

Fig. 15 is a rear elevation, and

Fig. 16 is a plan view, to larger scale, showing details of the mechanism for shifting the files from saw to saw, the parts being shown in the position they occupy immediately after the first shift;

Fig. 17 is a rear elevation of the shift controlling cam;

Fig. 18 is an elevation of said cam, viewed from the right side; and

Fig. 19 is a detail of a connecting block forming a part of the mechanism of Fig. 14.

Figure 1:
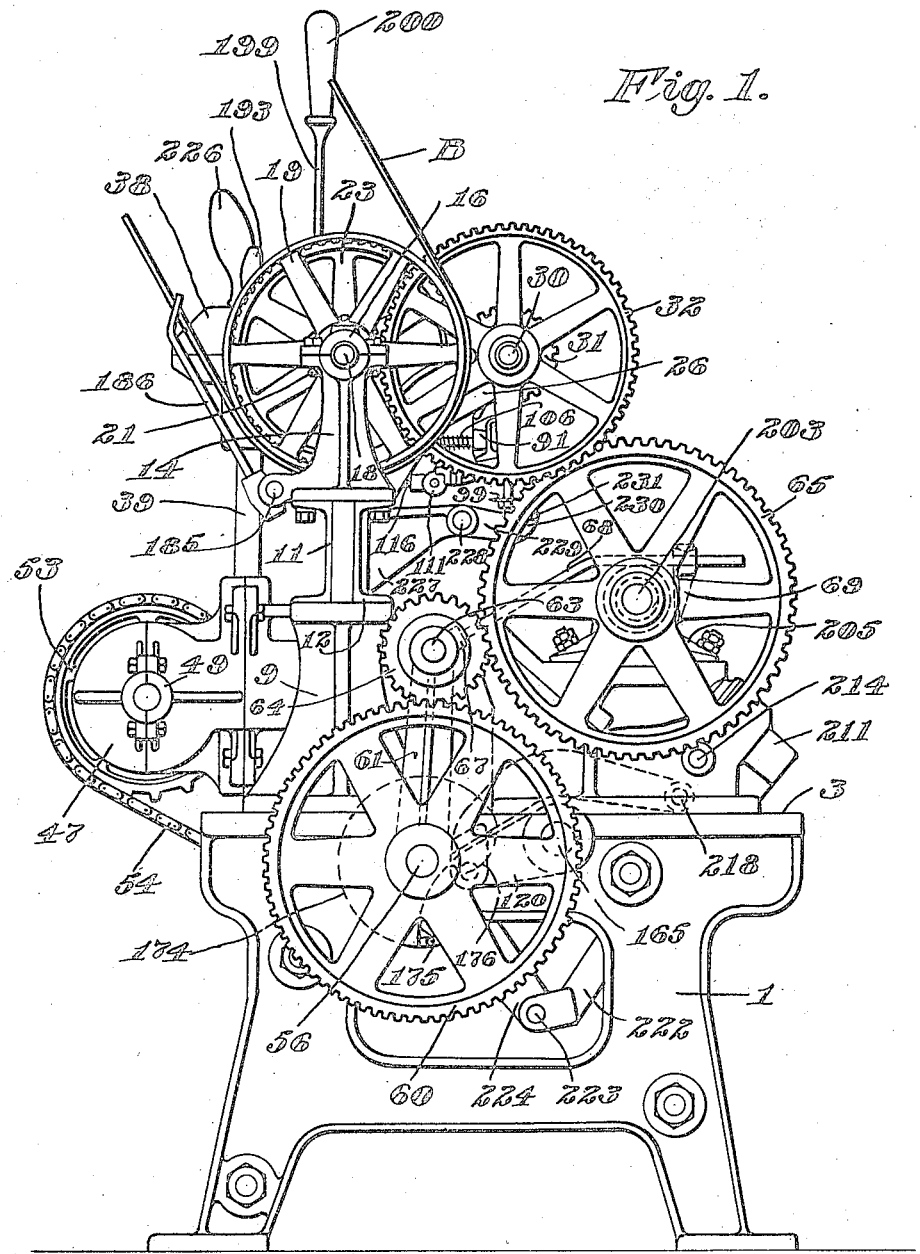

Referring to the several figures of the drawings, the machine is shown as comprising a pair of end frame members 1, 2, having substantially horizontal upper surfaces 3, 4, respectively, upon which certain of the operative devices of the machine are mounted. These end frames are preferably formed as castings, and are secured in properly spaced relation by a series of rods, 5, 6, 7, 8, extending from one end frame to the other and secured thereto by means of nuts engaging threaded end portions of such rods. Mounted upon the rear part of each end frame is a supporting bracket 9, 10, respectively, and secured to the tops of said brackets are a pair of channel bars 11, 12, (Fig. 5) the channels of such bars facing rearwardly and forwardly respectively and providing between them a space 13. These bars extend from side to side of the machine and at the left hand side extend beyond the frame member 1. A pair of brackets 14, 15, are mounted upon the bars 11, 12 at the overhanging portion thereof, such brackets providing bearings 16, 17 respectively (Fig. 8) in which a main drive shaft 18 is mounted to turn. Mounted upon this driving shaft, between the brackets 14, 15, is a loose pulley 19 and a fixed pulley 20, such pulleys being adapted to be driven by a belt B from any desired source of power. Adjacent to the fixed pulley 20 and to the right thereof, as viewed from the front of the machine, is a pinion 21 also fixed to the shaft.

To the right of the bracket 15 a sleeve 22 is mounted upon the shaft to rotate freely thereon and fixed to this sleeve is a gear 23 and a cam disk 24, such disk being provided with a peripheral cam groove 25. Except for a lateral offset at 25ᵃ, of relatively small angular extent, this groove lies in a plane perpendicular to the shaft. The bracket 15 is provided with a forwardly extending arm 26 (Fig. 3ᵃ) providing a bearing at 27 having a journal opening which aligns with a journal opening formed in a bearing 28 (Fig. 3ᵇ) carried at the forward end of a bracket 29 mounted upon the bars 11, 12, adjacent to the right hand side of the machine. Within the journal openings thus provided, a shaft 30 is arranged to turn, such shaft being also slidable longitudinally in its bearings. Where the shaft 30 passes through the bearings 27 it is surrounded by a sleeve 30ᵃ (Fig. 9) having a pinion 31 secured thereto at the right of the bearing and a gear 32 fixed thereto at the left of the bearing The pinion 31 meshes with the gear 23 carried by the sleeve 22, as above described, while the gear 32 meshes with the pinion 21 fixed to the drive shaft. The sleeve 30ᵃ, on which the pinion 32 is mounted, is splined to the shaft 30, permitting the latter to slide freely therethrough but rotating the shaft when the gear 32 is turned. With this arrangement it is evident that the shaft 30 will be rotated oppositely to the main drive shaft and at a reduced speed, while the cam disk 24 will be turned in the same direction as the drive shaft and at still slower speed.

To the right of the cam disk 24, a bracket 33 (Fig. 2ᵃ) is secured upon the bars 11, 12, such bracket providing a bearing 34 in which the right hand end portion of the main drive shaft 18 turns. This bearing is enlarged to form a housing 35 (Fig. 6) within which is arranged a worm 36 fast upon the main drive shaft and which meshes with a worm wheel 37 arranged within a housing 38 integral with the housing 36, such worm wheel being fixed to the upper end of a vertical shaft 39. This shaft turns in an upper bearing 40 carried by the bracket 33 and in spaced lower bearings 41, 42, carried by a bracket 43 secured to the lower surfaces of the bars 11, 12. Between the bearings 41 and 42 a housing 44 is provided within which is arranged a worm 45 secured to the shaft 49 and meshing with a worm wheel 46 disposed within a housing 47 projecting rearwardly from the bracket 43, such wheel being fixed to a shaft 48. This shaft 48 turns in aligned bearings 49, 50 (Fig. 2ᵃ) carried by the bracket 43 and is supported at its right hand end in the bearing 51 (Fig. 2ᵇ) carried by a bracket 52 also secured to the under side of the rails 11, 12. The shaft 48 projects to the right beyond the bearing 51 and has secured thereto a sprocket wheel 53 over which a sprocket chain 54 is trained. This chain also passes about a sprocket wheel 55 carried by a shaft 56 supported at its right hand end portion in a bearing 57 carried by a depending bracket arm 58 secured to the rails 11, 12. At its right hand end the shaft 56 passes through a journal opening in a bearing boss 59 in the end frame member 1, and has a gear wheel 60 fixed to its outer extremity, the hub of such gear being spaced from the bearing 59. A supporting arm 61 is journaled upon the shaft 56 between the bearing 59 and the hub of the gear 60, such arm having a boss 62 (Figs. 1 and 2ª) at its outer extremity in which is secured a pin 63. This pin forms a pivot upon which a pinion 64 is journaled, such pinion meshing with the gear 60 in all positions of the arm 61 and also meshing with a large gear 65 mounted upon the saw supporting shaft as will hereinafter be more fully described. A collar member 67 is pivotally supported upon the right hand end of the pin 63, such collar member having a rod 68 which extends forwardly and upwardly and is adapted to contact with the front side of the peripheral surface of the hub 66 of the gear 65. This arm 68, with the member 69, serves constantly to maintain the pinion 64 in engagement with the gears 60 and 65 regardless of the position of the support upon which the latter gear is mounted.

Extending to the right from the bracket 33 (Fig. 2ª) is a bearing 70 in which is journaled the left hand end of an axially slidable rock shaft 71. The right hand portion of this shaft is supported in a bearing 72 (Fig. 2ᵇ) carried by a bracket 73 mounted upon the rails 11, 12, the shaft also being supported at an intermediate point by a bearing 74 carried by a bracket 74ª carried by the rails. Mounted upon the shaft 71 are a plurality of brackets 75, 76, 77, such brackets being secured to the shaft by means of set screws 78. These brackets comprise the horizontal arms 79, (Figs. 3ª and 3ᵇ) 80, 81 respectively of like construction, each arm being divided at its forward edge to form a plurality of spaced fingers 82. These brackets are also provided with vertically arranged arms 83, 84, 85 respectively, the lower ends of the several arms, as indicated for example in Fig. 12, being furnished with screw threaded bores for the reception of threaded pins 85ª upon which turn rollers such as 86. These rollers bear against the forward faces of plates 87 secured to blocks 89 projecting upwardly from between the rails 11, 12, the engagement of the rollers with the plates serving to support the horizontal arms of the brackets in proper position, while also permitting such brackets to move lengthwise of the machine with the shaft 71.

Upon the shaft 30 a series of bevel gears 90 is arranged (Fig. 3ª and 11), each of the gears being fixedly secured to the shaft by means of a set screw or pin. The several gears are spaced apart to provide for brackets 91 suspended from the shaft and interposed between adjacent gears. To each of the brackets 91 a frame 92 (Fig. 11) is secured, such frame providing upper and lower bearings 93, 94 respectively. In the upper bearing of each frame the elongated hub of a pinion 96 is arranged to turn. A vertical shaft 95 is splined to such hub to turn therewith but being movable axially with respect thereto, such shaft passing through the lower bearing 94 and having a collar 97 secured thereto. This collar is arranged above the upper bearing and serves to limit downward movement of the shaft. Each pinion 96 meshes with one of the bevel gears 90 and is driven thereby. The lower end of each shaft 95 is provided with an internally threaded bore for the reception of a bolt 98 by means of which a disk file 99 may be secured to the lower end of the shaft.

To the rear of the shaft 30 each of the horizontal arms 79, 80, 81 respectively of the brackets 75, 76, 77 is provided with a pin 100 (Fig. 11) upon which a yoke 101 is pivotally secured. A rod 102 has screw threaded connection with each of said yokes, such rods being secured to a longitudinally extending bar 103 and serving to support the latter. This bar 103 is provided at its rear edge with a series of pairs of spaced upstanding ears 104 (Figs. 3ª and 14), such ears each being provided with an upwardly opening slot 105. To each of the brackets 93 a rod 106 (Figs. 11 and 14) is secured by means of a pin 107, the forward ends of such rods entering openings 108 in the frames 92, while the rear ends of the several rods are provided with slidable bocks 107 having laterally projecting pins 108 fixed therein. The oppositely projecting ends of such pins are arranged to engage within the slots 105 in the ears 104 of plate 103. The ends of rods 106 are preferably screw threaded for the reception of nuts 107ª serving to prevent the blocks from escaping from the rods. Each of the rods 106 is surrounded by a coil spring 109 bearing at one end against the block 107 and at its other end against the enlarged forward end of the rod, such springs tending normally to swing the frames 92 forwardly with respect to the plate 103. Secured to the lower face of the latter plate is an angle bar 110 provided with four pairs of downwardly and rearwardly projecting ears 111, and having a bar 112 secured to the forward face of its depending flange. Extending forward from the bar 112 are pairs of arms 113 (Fig. 11) the arms of each pair having oppositely directed bosses 114 adjacent to their extremities, such bosses normally engaging substantially flat vertical surfaces 115 of bosses projecting from the opposite sides of the bearing 94 of each frame. The arms 113 thus serve as guides for the frames 93 as the latter oscillate about the axis of the shaft 30 as will be more fully described hereinafter.

Secured to each pair of ears 111 carried by the bar 110, is a rod 116, (Figs. 3ª, 3ᵇ and 14) the several rods extending rearwardly between pairs of pins 117 upstanding from the top surface of the channel bar 12. Three of the rods 116 are pivotally secured at their rear extremities to arms 118, 119, 120 (Figs. 3ª and 3ᵇ) respectively of the bell crank levers fulcrumed upon pins projecting upwardly from the channel bar 11. The connections of the fourth rod will be described hereinafter. The other arms of such bell crank levers are pivotally connected at the points 121, 122 and 123 respectively to a longitudinally slidable bar 124. This bar 124 is suitably guided in bearings carried by the channel bars 11, 12 and at its left hand extremity is connected by means of a pin 124ª to a slide block 125. This slide block 125, as indicated more particularly in Figs. 3ª and 5, is mounted in a suitable guideway immediately beneath the cam disk 24 and is provided with a hollow pivot pin 126 upon which a cam roll 127 turns. This roll 127 engages the cam groove 25 of the cam disk 24 and by reason of the contour of the cam groove, the cam roll with the slide block 125 is constrained at intervals to reciprocate longitudinally of the machine. Preferably the hollow pivot pin 126 communicates with a pipe 128 which is turned upwardly at its rear end and serves as an oil reservoir whereby the cam roll 127 may be properly lubricated.

At that portion of the shaft 71, which lies between the bearings 72 and 74 (Figs. 2ᵇ, 15 and 16) the upper surface of such shaft is provided with three sets 130, 131, and 132 of three ratchet teeth each. The ratchet teeth 130 cooperate with a retaining pawl 134 pivotally supported between a pair of ears 135 carried by the bearing 72. A stop pawl 136 is arranged to cooperate with the teeth 132, such pawl being pivoted between a pair of ears 137 upstanding from the bearing 74. A spring 138 tends normally to depress the stop pawl 136. As may be seen in Figs. 3ᵇ and 16, the stop pawl is of a width substantially greater than the diameter of the shaft 71 and the opposite ends of such pawl are adapted normally to rest upon substantially flat upper faces of bosses projecting upwardly from a pair of links 139, 140 respectively. These links are pivoted at 141 to opposite sides of the bearing 74, the other ends of such links being pivotally connected to links 143, 144 respectively. The latter links, at their right hand ends, are pivotally secured to a collar 145 slidable along the shaft 71, such collar having a pair of upstanding ears 146 between which a driving pawl 147 is pivoted, the latter pawl being engageable with the ratchet teeth 131.

The pivot pins 142ª, 142ᵇ, by means of which the links of each pair are connected, are secured respectively to the front and rear sides of a yoke member 148 (Figs. 7 and 15). This yoke member is pivotally secured by means of a pin 149 to a block having screw threaded connection with the upper end of a rod 150, such rod extending downwardly through an opening in a plate 151, secured to the upper surfaces of the bars 11, 12, and between such bars where it is surrounded by a coil spring 152. The lower end of such spring rests upon a flange 153 outstanding from the rod 150 thus normally tending to depress the rod. The lower portion 154 of the rod passes through a threaded sleeve 155 having a head 156 whereby it may be turned. The screw threaded portion of such sleeve engages a threaded opening in a bracket member 158 carried by the lower edges of the bars 11, 12, the upper end of the sleeve constituting an adjustable stop for limiting downward movement of flange 153. The rod 150 is connected at its lower end to a yoke member 159, such yoke member having laterally spaced arms between which an anti-friction roller 160 (Fig. 7) is journaled. At its lower end this yoke is secured to a guide rod 161 passing through an opening in the bearing 162 carried by the rear arm 163 of a bracket 164. This bracket is provided with a journal opening through which passes the shaft 56 and with a second journal opening through which a shaft 165 passes, the latter shaft being mounted at its opposite extremities in bearing openings in the end frame members.

An arm 166 projects rearwardly from the bracket 158 and is provided with a pin 167 upon which a lever 168 is pivotally mounted. At its lower end this lever is pivoted at the point 169 to an arm 170 having a substantially flat surface 177 for engagement with the roller 160, and being provided adjacent to its forward extremity with a cam engaging shoe 172 (Figs. 17 and 18) which rests upon the peripheral surface of a cam 173 fixedly mounted upon the shaft 56. This cam 173 comprises a substantially concentric circular portion 174, followed by an abrupt and substantially radial shoulder 175 from the inner end of which extends an incline 176 leading gradually outwardly to the peripheral surface 174 of the cam.

The upper end of the lever 168 (Fig. 7) is provided with an internally screw threaded bore for the reception of a shouldered bolt 177 upon which a roller 178 is mounted to turn. This roller engages a slot 179 in the rearwardly extending arm 180 of a bell crank lever pivoted to turn about a pin 180ª projecting vertically from the bar 11. The forward arm of each lever is pivotally connected at 181 with the bar 124 and as the latter reciprocates such bell crank lever is caused to oscillate about its pivot. The bell crank lever is also provided with a laterally extending arm 180$^b$ to which the rear end of the fourth rod 116 is pivotally secured, the forward end of such rod being joined to the bar 110 in the same manner as are the rods 116 which are connected to the lever arms 118, 119, 120.

Projecting rearwardly from the bracket 14 is a bearing 182 (Figs. 2$^a$ and 3$^a$) and a similar, aligned bearing 182$^a$ projects from the bracket 15. Additional bearings 183 and 184 are also provided in alignment with bearings 182 and 182$^a$. A belt shipper rod 185 is arranged to slide longitudinally in the several bearings just described. This belt shipper rod is provided with an adjustable collar 186 spaced from the left hand side of the bearing 183, and between such bearing and collar a coil spring 187 is arranged, such spring surrounding the shipper rod and tending normally to move such rod to the left. Adjacent to its left hand extremity, the shipper rod is provided with shipper arms 187 arranged to engage the edges of the belt B and to move the latter from one of the pulleys to the other. At a point somewhat to the left of the bracket 76, the shipper rod is provided with a latch pin 188 with which engages a latch 189 (Figs. 2$^b$, 3$^b$ and 15) pivotally supported upon the rear face of a bracket 190 carried by the bar 12. An actuating arm 191 extends upward from the latch 189 and serves as a means for rocking the latter whereby to disengage it from the pin 188. This arm 191 normally lies somewhat to the left of the bracket 76 but is arranged in the path of the latter so that as such bracket moves to the left during the operation of the machine, it comes into contact with the arm 191 and automatically disengages the latch thereby permitting the spring 187 to shift the rod 185, thus moving the belt from the fast to the lose pulley.

At the rear of the machine adjacent to the right hand end thereof, a lever 192 having a handle 193 is pivoted at 194 to a bracket 195 carried by the rear channel bar 11. At an intermediate point, this lever is provided with a slot 196 through which passes a belt 197 secured to a sleeve 198 fixed to the shipper rod 185. By means of this lever, the shipper rod may be moved to the right in opposition to its spring 187, for restarting the machine.

A lever 199 provided with a handle 200 is pivotally connected to the bracket 77, the set screw 78 being suitably formed to provide a pivotal bearing for the lever. The lower end of the lever 177 is forked as indicated at 201, for engagement with a pin 202 fixedly secured and projecting rearwardly from the plate 87. By means of this lever the bar 71 may be moved to the right in restarting the machine.

A saw carrying shaft is indicated at 203 (Fig. 3$^a$) such shaft being provided with a series of saws 204 in the usual manner, and having the gear 65 secured to its left hand end during the operation of the machine. This saw shaft rests in a pair of cradles 205 arranged respectively at the opposite sides of the machine. These cradles are mounted upon supports 206 (Fig. 5) of substantially like form and each provided with an inclined shoe 207 engaging an upwardly and rearwardly inclined surface 208 of a bracket 209. The brackets 209 are mounted upon the end frame members 1, 2, respectively. The supports 206 are each also furnished with forwardly and downwardly directed rods 210, the lower ends of which are slidable within bearings 211 formed in the brackets 209. These rods are screw threaded at an intermediate portion of their lengths for the reception of internally screw threaded worm wheels 212 constituting nuts for engagement with such rods. Each of these worm wheels engages a worm 213 carried by a shaft 214 which extends transversely of the machine and the ends of which are journaled in the respective brackets 209. At the right hand end of the machine this shaft is furnished with a crank 215 whereby it may be turned, thus simultaneously turning the worms 213 and worm wheels 212 and causing the supports 206 to move upwardly and rearwardly, or downwardly and forwardly as may be desired, in order to adjust the saw shaft vertically to bring the saws into proper operative position with relation to the files. As the saws are gradually reduced in diameter due to wear, the position of the cradles may be changed so that the pitch of the saw teeth as they are cut away by the gummer files will not be varied.

The brackets 209 are slotted in a front to rear direction, as indicated at 216 for engagement with bolts 217 projecting upwardly through the end frames. The brackets 209 are thus permitted to move forwardly and rearwardly in a horizontal direction relatively to the end frames for bodily moving the saw shaft into and out of operative position.

Projecting from each of the brackets 209 is a pin 218 (Fig. 7) to which the forward end of a link 219 is secured. The rear end of each link is pivotally connected to the rear end of a rocker lever 120 (Figs. 4, 2$^a$ and 2$^b$) fixedly secured upon the shaft 165. At the right hand end of the machine, a forwardly extending arm 220$^a$ is secured to the end of shaft 165 outside the frame member 2, said arm having a pivot pin 221 to which the upper end of a link 222 is secured. The lower end of such link is pivoted at 223 to the lower end of a lever 224, said lever having an upwardly extending arm 225 provided with a handle 226.

Projecting forwardly from the plate 112 are a plurality of brackets 227 (Fig. 10) serving to support a shaft 228 upon which a plate 229 is mounted. This plate is provided with a series of forwardly extending arms 230 provided with bosses 231 adapted respectively to engage one side of each of the saw blades 204 to support such blade against the lateral pressure of the file. If desired, suitable guard members 232, such as indicated by way of example in dotted lines in Fig. 6, may be provided for protecting the operative mechanism from dust and dirt and for reducing the danger of injury to the workmen.

The operation of the machine is substantially as follows, it being assumed that the machine has just been stopped at completion of the operation upon a saw cylinder. For removing the completed saw cylinder from the machine, the operator grasps the handle 226 and draws the latter forwardly, thereby causing the supporting brackets 209 to slide forwardly upon the end members of the frame. This movement of the brackets carries the saws out of the range of the files but does not disengage the gear 65 from the driving pinion 64, the latter being constrained to follow the movement of gear 65 by the rod 68 with its depending arm 69. The gear 65 is now removed from the saw shaft and the arm 68 is lifted, thereby permitting the saw shaft to be removed from its cradles. A new saw shaft having a fresh set of saws to be gummed is now placed in the cradles, the gear 65 is secured in position upon the shaft, and the arm 68 is dropped into operative position, holding the pinion 64 in mesh with the gear 65.

Either before or after the mounting of the saw shaft in its cradles, the operator moves the handle 199 to the right thereby causing the shaft 71 to slide longitudinally to the right, the pawls 134 and 147 being manually lifted during such movement. At the completion of this movement, the pawl 134 rests upon the upper surface of the shaft 71 just to the left of the last tooth of group 130, the pawl 137 rests upon the upper surface of the shaft 71 just to the left of the left hand ratchet tooth of the group 131, while the stop pawl 136 engages the left hand tooth of group 132. At this time the shoe 173 engages the inner part of the cam incline 176. The operator now moves the saw cylinder rearwardly by manipulation of the handle 226. The arrangement of the levers 219 and 220 is such that the pivotal connection of the lever 219 to the arm 220 is substantially in alignment with the axis of shaft 165 and with the pivotal connection 218 of the lever 219 to the bracket 209. The toggle arrangement thus provided serves to lock the saw against accidental displacement when in operative position, but permits it to be moved forwardly merely by manipulation of the lever 225.

In the machine as herein disclosed, a file 99 is provided for each group of three saws upon the saw shaft, and in starting the machine each file is in position to engage a tooth of the right hand saw of its particular group. The operator now swings the lever 193 to the right, thereby moving the belt shipper rod 185 to the right and bringing its pin 188 into operative engagement with the latch 189 which serves to hold such rod in operative position, the spring 187 being placed under compression during the above described movement of the rod. The movement of the belt shipper rod to the right serves to carry the belt B from the loose pulley 19 to the fixed pulley 20, the parts now occupying the position indicated in Figs. 2$^a$, 2$^b$, and 3$^a$, 3$^b$. As soon as the drive shaft 18 begins to rotate, the shaft 30 is also rotated through the reduction gearing comprising the pinion 21, gear 32 and pinion 31, while at the same time the cam disk 24 is also rotated, but at a speed still slower than that of the shaft 30, by means of pinion 31 and the gear 23. The worm 36 is also rotated with the drive shaft, thus, by means of the worm wheel 37, the worm 45, and the worm wheel 46, rotates the shaft 48, which in turn, by means of the chain 54, turns the cam shaft 56. As the latter shaft turns slowly the shoe 172 gradually moves up the incline 176 thereby placing the spring 152 under compression, and at the same time, by means of the links 139, 143, 140, 144, causing the sleeve 145 to move to the right until the pawl 147 drops into the left hand tooth of the group 143 at which time the links of each pair are substantially in alignment and the stop pawl 146 is lifted, by engagement with the links 142 and 144, out of engagement with the left hand tooth of the group 132. Cam shoe 172 now rests upon the circular peripheral surface of the cam 173 which occupies substantially three-fourths of the circumference of the cam.

During the above described movement of the cam 173, the cam disk 24, having the cam groove 25, acts at intervals to reciprocate the bar 124. The reciprocation of this bar in a longitudinal direction is transmitted by means of the bell crank levers 118, 119, etc., to the rods 116 and thence to the swing frame comprising the members 103, 110 and 112. The oscillating movement of this frame 9 about the axis provided by the aligned pins 100 is transmitted to the file carrying frames 92 through the several coil springs 109. The frames 92 are thus compelled to oscillate about the axis of the shaft 30 while at the same time the rotation of shaft 30 causes the gears 90 to turn, thereby driving the pinions 96 carried by the file shafts 95 and thus causing such shafts to turn. The file disks 99 are thus rotated while being resiliently forced against the edges of the saw blades.

The arrangement of the parts is such that the reaction between the gears 90 and their corresponding pinions 96 opposes the action of the springs 109 which normally tend to swing the frames 92 forwardly. Increased resistance to rotation of the files is then compensated for by the increased rearward component of the driving force, so that any tendency of the files to bite into the saws to an undesirable extent is prevented. The contour of the cam groove 25 is such that during the engagement of the files with the saws, upon the forward oscillation of the file frames, sufficient time is permitted for the proper gumming of the saw tooth. During the interval in which file frames are moved to the rear, the saw is turned an amount substantially equal to the distance between the teeth by the driving mechanism including the gear 60, the pinion 64 and the gear 65. As there is some back lash between such driving gears, however, the forward oscillation of the file frame serves by engagement of the files with the next succeeding saw tooth properly to center the files with respect to such teeth, the proper finding of the saw teeth by the files being facilitated by the fact that the file discs are free to move vertically to a limited extent, the provision of the resilient connection between the driving frame and the file frames further assisting the several files to find the proper saw teeth automatically and without necessitating such accurate timing of the parts as otherwise might be necessary. The springs 109 also determine the pressure of the files against the saws, and in view of the character of the labor employed in operating such machines, it is found preferably to provide springs 109 of a suitable tension for the work in hand, and to omit any means by which the operator might improperly vary such predetermined tension. It is, of course possible and is contemplated that springs of other tension may be provided if desired, and as circumstances may require.

The machine continues to operate as has been described until the saw shaft has made a complete revolution. During the movement of the file frames in oscillating backwardly and forwardly, the bell crank lever comprising the arm 180 is also oscillated. The slot 179, acting upon the roll 178, thus serves to oscillate the lever 168 about its axis 167, thus causing the cam shoe 172 to move backwardly and forwardly to a slight extent while resting upon the peripheral surface of the cam 173. The timing of the parts is such that as the shoulder 175 of the cam 173 slowly approaches the cam shoe 172, the latter in its forward oscillation moves toward such shoulder 175 at the instant that the file frames are moving rearwardly. Thus the falling of the shoe 172 from the peripheral surface of the cam at the shoulder 175 while the files are clear of the saws is assured. The dropping of the cam roll 172 permits the spring 152 by its expansive action to depress the rod 150, thereby carrying the yoke 148 downwardly, and breaking the toggles comprising the links 139, 143; 140, 144. This movement causes the sleeve 145 with its pawl 147 to move to the left, carrying the shaft 171 to the left a distance substantially equal to the space between successive teeth of the group 131. The stop pawl 136 is permitted to drop as the link 139 moves downwardly, such stop pawl then engaging the left hand notch of the series 132 and preventing further movement of the shaft 71 to the left. This movement of the shaft 71 carries the brackets 75, 76, 77, to the left and thereby moves the bracket arms 79, 80, 81, to the left. The fingers 82 of these arms which engage between certain of the gears of the shaft 30, cause the latter shaft to move to the left in its bearings, thereby shifting the file frames to the left a distance sufficient to present each file for engagement with the next saw to the left in the corresponding group. This entire movement takes place while the file frames are making a backward and forward reciprocation and while the files are out of engagement with the saws.

The machine continues to operate, and each file now starts upon a new saw of the series, the operation continuing as above described until each tooth of such second saw of each group is properly gummed. During such operation the cam shoe 172 again moves up the cam incline 176 onto the peripheral surface of the cam 173 and the sleeve 145 is thereby moved to the right, thus engaging the pawl 147 with the central tooth of the group 131, and the stop pawl 136 is again raised. At the same time the pawl 134 is caused to engage with the central tooth of the group 130. At the completion of the second saw of each group, the cam shoe 172 again falls from the shoulder 175, while the file frames are in rearward position, whereupon the spring 152 again acts to shift the shaft 71 a further step to the left.

The operation is then repeated, the files now cooperating with the third saw of each group until the saw shaft has made another complete revolution. When now the cam shoe 172 again drops from the shoulder 175 the shaft 71 is again moved to the left but at this movement the bracket 76 engages the lever arm 191 of the latch member 189, thus disengaging the latter from the pin 188. Spring 187 now acts to move the belt shipper rod 185 to the left thereby carrying the belt from the fast to the loose pulley and bringing the machine to rest, the gumming of the entire set of saws having thus been completed and the machine being in position for permitting removal of the saw shaft and its replacement by a new shaft as above described.

If at any time during the operation of the machine the operator desires to stop the machine, as for example for renewing the files, he may do so by manual actuation of the lever arm 191, and may then draw the saws out of engagement with the files by manipulation of the handle 226. Any individual file frame may now be swung forwardly to permit the removal of its file by disengaging its pins 107 from the slots 104 in the bar 103. The frame being swung forwardly, the file may be removed by loosening the bolt 98 and a new file may be substituted. The frame may again be properly connected to the member 103 merely by moving the pins 107 downwardly into the proper slots 104. When now the handle 226 is moved rearwardly, the saws are presented in proper position for the continuance of the operation by reason of the fact that the driving connections between the saw shaft and the shaft 56 are not disengaged by such forward movement of the saw shaft. The operation may then continue merely by swinging the lever 193 to the right and thereby moving the belt shipper rod into proper position for starting, without necessitating any manual turning of the saw shaft for bringing the files into engagement with the saw teeth.

It is thus evident that the machine operates in an automatic manner to complete the gumming of all the saws of the cylinder without any manual adjustment of parts during the operation. As a file is provided for every third saw it is possible to gum all the saws of the cylinder merely by causing the cylinder to rotate through three complete turns, while at the same time the mechanical parts are of such simple character as to permit the machine to be operated by the most unskilled class of labor.

While certain specific arrangements have herein been shown and described as particularly suitable for producing the desired relative movement of the several operative parts it is to be understood that other and equivalent means may well be substituted therefor if it should be found desirable so to do, while it is also contemplated that various rearrangements of the parts may be made as well as changes in the shapes and proportions of the parts such as may be found desirable in adapting the machine for use under especial circumstances.

What I claim and desire to secure by Letters Patent of the United States is:

1. A saw gumming machine comprising a longitudinally movable rotary shaft, a plurality of independent supports mounted to swing thereon, a file shaft mounted in bearings in each support and extending at an angle to said first named shaft, a disc file secured to each file shaft, means for transmitting motion of rotation of said first shaft to the several file shafts, and means for imparting intermittent longitudinal movement to said first shaft.

2. A machine of the class described comprising a longitudinally movable rotary shaft, a plurality of independent supports mounted thereon, file shafts mounted in bearings in the respective supports, files secured to the respective shafts, means for turning the several file shafts in their bearings, and means for moving said first named shaft in an axial direction.

3. A machine of the class described comprising a longitudinally movable, rotary shaft, a series of spaced gears secured to the shaft, a supporting frame suspended upon the shaft between each pair of adjacent gears, a file shaft journaled in each frame, means for transmitting movement to each file shaft, means for rotating said first named shaft, and means for moving said shaft with its gears and supporting frame in an axial direction.

4. A machine of the class described comprising means for supporting a saw cylinder, an oscillatory file, means for oscillating said file, means operative intermittently for shifting said file out of position for engagement with one saw of a cylinder mounted in said supporting means to position for engagement with another, and means moving with said file oscillating means for determining actuation of said shifting means.

5. A machine of the class described comprising means for supporting a saw cylinder, a disk file mounted to oscillate toward and from operative position relatively to saws of said cylinder, a reciprocating bar having connection to the file supporting means for oscillating the latter, cam controlled means for moving the file bodily in a direction longitudinally of the saw cylinder, said latter means comprising a cam follower engaging the peripheral surface of a cam, and means moving with said reciprocating bar for reciprocating said cam follower relatively to the surface of the cam whereby to ensure actuation of said cam follower by the cam at a predetermined time in the oscillation of said file.

6. A machine of the class described comprising a rotary file carrying shaft, means for supporting said shaft to oscillate in a vertical plane and for permitting bodily movement of said shaft in a direction transverse of its length, a cam actuated reciprocating bar, means connecting said bar with said shaft carrying means whereby to oscillate the latter, spring actuated means for imparting bodily movement to said shaft in a direction transverse its length means for compressing the spring comprising a cam having a dwell portion and an active portion, and a cam follower, a lever upon which the cam follower is supported, a bell crank lever having one end pivotally connected to said reciprocating bar and having a slot in its other end, and a roller carried by said lever and engaging said slot, the parts being so constructed and arranged as to cause the cam follower to approach the active portion of the cam for actuation thereby during the time that the file supporting shaft is retracted from the saw.

7. A machine of the class described comprising means for supporting a saw cylinder, a rotary driven shaft mounted in bearings to extend substantially parallel to the axis of such saw cylinder, said shaft being axially movable, a plurality of file carrying frames suspended from said shaft, a second shaft substantially parallel to said last named shaft, means connecting said shafts for simultaneous longitudinal movement and power actuated means for intermittently moving said second shaft in an axial direction.

8. A machine of the class described comprising means for supporting a saw cylinder, saw gumming means arranged for bodily movement longitudinally of said cylinder, a shaft provided with ratchet teeth, means for connecting said shaft with said gumming means for simultaneous longitudinal movement, a pawl engageable with the ratchet teeth of said shaft, a sleeve mounted upon the shaft and supporting said pawl, and spring means for moving said sleeve whereby through said pawl to move the shaft longitudinally and thereby to impart bodily movement of said gumming means.

9. A machine for gumming the saws of gin saw cylinders comprising bodily movable gumming means and means for imparting bodily movement thereto, said latter means comprising a shaft having a plurality of ratchet teeth therein, a sleeve slidable upon said shaft, a pawl carried by said sleeve and engageable with said teeth, spring means for moving said sleeve and thereby, through the pawl, moving said shaft, and power driven cam means for alternately compressing and releasing said spring.

10. A machine of the class described comprising bodily movable gumming means, a shaft having ratchet teeth thereon, means connecting said shaft with the gumming means, a pawl engageable with the ratchet teeth of said shaft, means for supporting said pawl for movement longitudinally of the axis of the shaft, a spring actuated bar, a link connecting said bar with said pawl carrying means, means for compressing the spring whereby said bar is actuated, and means for suddenly releasing said spring whereby through said pawl to move the shaft longitudinally thereby imparting movement to the gumming means.

11. In a machine of the class described, a gumming element arranged for successive engagement with adjacent saws of a saw cylinder and means for moving said gumming element from one saw to the other comprising a driving pawl, spring means for actuating said pawl, and a rotating cam for alternately compressing said spring and releasing the same, said cam having an active portion of relatively small angular extent and an inactive portion of relatively great angular extent.

12. A machine of the class described comprising mean for supporting and rotating a saw cylinder, gumming means arranged for bodily movement longitudinally of the saw cylinder, and means for so moving said gumming means comprising a rotating cam disc turning once for each rotation of the saw cylinder and having an abrupt inwardly descending portion followed by a gradual outward incline, a cam follower engaging said cam for actuation thereby, a spring arranged to be compressed by said cam follower as the latter mounts said incline, and an element connected with said cam follower and adapted suddenly to move the gumming means upon release of the spring as the cam follower again descends the abrupt inwardly directed portion of said cam.

13. A machine of the class described comprising an oscillatory file frame, a file supported thereby, an oscillatory bar, power actuated means for oscillating the latter, and resilient connections between said bar and frame for transmitting movement from the bar to the frame.

14. In a machine of the class described, a movable file carrying frame, a power actuated oscillatory element, and resilient means connecting said element and frame, said resilient means being manually disengageable from said element whereby to permit movement of the frame independently of said element.

15. A machine of the class described comprising a rotating shaft, a series of file carrying frames suspended therefrom, files carried by the respective frames, a bar extending substantially parallel to said shaft, means for bodily moving said bar in a direction transverse of its length, and independent means connecting each of said file frames to said bar.

16. A saw gumming machine comprising a series of file supporting devices pivoted upon a rotating shaft, files carried thereby, drive connections between the shaft and the several files, means for simultaneously actuating said files for gumming teeth of a plurality of saws, and means permitting each individual supporting device to be moved to inoperative position independently of the others.

17. A saw gumming machine comprising a series of file supporting frames suspended to swing upon a rotating shaft, a disc file carried by each frame, means for simultaneously rotating said files, means normally connected to the several frames for simultaneously oscillating them, and means permitting the free disconnection of any of said frames from said oscillating means.

18. A saw gumming machine comprising an oscillatory file supporting frame, a normally vertical file shaft mounted therein, means for securing a file to the shaft, and means for swinging said frame for bringing the file into operative engagement with a saw blade, said last named means comprising pin and slot connections constructed and arranged to permit the frame to be swung out of normal position to present the saw shaft in position for the ready removal and replacement of the file.

19. A saw gumming machine comprising a series of file supporting frames, a normally vertical file shaft carried by each frame, means for securing a file to each shaft, and means for moving the several frames whereby to bring the files into operative engagement with the saw, the parts being so constructed and arranged as to permit said frames independently to be so moved as to cause the respective file shafts to lie in substantially horizontal planes to permit the ready attachment or removal of a file.

20. A machine of the class described comprising a supporting shaft, a series of file carrying frames suspended therefrom for oscillation about the axis thereof, a bar extending substantially parallel to said shaft, and arranged for oscillation about an axis parallel to said shaft, a link pivotally connected to each of said file frames, and means for connecting the several links to said bar whereby oscillation of said bar serves simultaneously to oscillate the file frames about the axis of the supporting shaft.

21. A machine for gumming gin saws comprising a shaft, a series of frame supported thereby, each of said frames being provided with saw gumming means, a bar extending substantially parallel to said shaft, means for supporting said bar to oscillate about an axis parrallel to said shaft, power means for oscillating said bar, and resilient means connecting each of said frames with said bar.

22. A machine for gumming saws comprising a series of movable, file carrying frames, a bar extending longitudinally of said series and spaced therefrom, said bar being movable in a direction transverse of said series, a link pivotally connected to each of said frames, a block slidably mounted upon each of said links, a coil spring surrounding each link and bearing at one end against a corresponding block and at its other end against an enlargement of the link, and means for connecting the several blocks to said bar, whereby resiliently and simultaneously to transmit movement from the bar to the several frames.

23. A machine of the class described comprising a series of movable file carrying frames, a bar extending longitudinally of said series, said bar having ears projecting therefrom, such ears having open slots therein, links pivotally secured to the respective frames, blocks slidably engaging each of said links, and pins projecting laterally from the several blocks and arranged for engagement with the slots in the ears projecting from said bar.

24. A machine of the class described comprising a supporting shaft, a plurality of file carrying frames suspended therefrom, a bar suspended to oscillate about an axis parallel to that of the shaft, links pivotally secured to the respective file frames, blocks slidably mounted upon each of said links, said blocks having pins projecting laterally from either side thereof, coil springs surrounding the respective links and bearing at one end against the corresponding block and at the other against an enlarged portion of the link and pairs of slotted ears projecting from the bar, said ears being spaced for the reception of the respective blocks therebetween and having open ended slots for the reception of the respective pins carried by the several blocks.

25. A machine for gumming gin saws comprising a series of file carrying frames and means for synchronously moving said frames comprising a bar arranged for reciprocation in a path substantially parallel to said series of frames, a bar arranged to move in a direction transverse of such series, bell crank levers and connecting rods for connecting said bars whereby to transform longitudinal movement of the first bar into transverse movement of the second bar, and means for connecting each of the frames of the series to said second bar for simultaneous movement therewith.

26. Mechanism of the class described comprising a series of file supporting frames suspended for oscillation from a rotating shaft, a bar mounted to oscillate about an axis parallel to that of the shaft, links connecting the several frames to said bar, connecting rods pivotally connected to said bar, bell crank levers having one arm of each secured to one of said connecting rods, a bar arranged for reciprocating movement in a direction substantially parallel to said shaft, means connecting the other arms of the respective bell crank levers to said bar, a rotating cam disk having a cam groove therein and a cam follower connected to one end of said latter bar and engaging said cam groove.

27. A machine of the class described comprising a series of oscillatory file carrying frames, a power driven shaft, a cam upon said shaft, a reciprocal cam follower engaging said cam, and means for transmitting movement from said follower simultaneously to the several frames for oscillating the latter, said cam being so constructed and arranged as to impart a complete reciprocation to the cam follower during a relatively short angular movement of the shaft and thereafter to hold such follower immovable through the remaining portion of such turning movement of the shaft.

28. In a machine of the class described, a power driven shaft, a cam disk mounted thereon, said disk having a peripheral groove, a cam follower roll engaging said groove, and means for supplying oil to the bottom of said groove adjacent to said roll.

29. A machine of the class described comprising oscillatory gumming means and means for actuating said gumming means comprising a rotary disk having a peripheral cam groove, a cam roll engaging said groove, a hollow pivot pin upon which said roll is mounted and means constituting an oil reservoir supplying oil to the interior of said pin.

30. A machine for gumming saws comprising a gumming element, and automatically acting means for regulating the pressure of such element against the edge of a saw blade.

31. A machine for gumming saws comprising a gumming element, and means for automatically regulating the pressure between such element and the saw blade in accordance with the resistance offered by such blade to the action of said element.

32. A saw gumming machine comprising a gumming element, means for resiliently urging said element into operative engagement with the edge of a saw blade, and means for operatively actuating said gumming element, said actuating means being so constructed and arranged as to oppose the action of said resilient means in direct ratio to the resistance encountered by the gumming element.

33. A saw gumming machine comprising a file, means for urging said file into operative engagement with the edge of a saw blade, means for operatively actuating said file, and driving means for said actuating means so constructed and arranged as to exert a component of the driving force in a direction to oppose the action of the means urging the file into engagement with the saw.

34. A saw gumming machine comprising a rotary disk file, resilient means normally urging said file into operative engagement with the edge of a saw blade, and means, including a pair of intermeshing gears, for rotating said file, the arrangement of such gears being such that a component of the force transmitted thereby acts oppositely to said resilient means.

35. A saw gumming machine comprising a rotary shaft, a frame suspended from said shaft, a gear secured to the shaft adjacent to said frame, a file shaft journalled in the frame, a pinion splined to the file shaft and engaging the gear, a disk file secured to said file shaft, resilient means for swinging said frame about the axis of said first shaft whereby to bring the file into operative engagement with a saw blade, and means for rotating said first shaft, the relative arrangement of said gear and pinion being such that a component of the power transmitted thereby acts in opposition to said resilient means.

36. A machine of the class described comprising saw gumming means, and means for supporting a saw cylinder in operative position with relation to such gumming means, power actuated means for operating such gumming means and for slowly turning the saw cylinder, and means whereby such saw cylinder may be moved out of operative engagement with the gumming means without disengaging such saw cylinder from its driving mechanism.

37. A machine of the class described comprising a frame having guideways thereon, saw supporting means slidable upon said guideways, a power driven shaft turning in fixed bearings in such frame, a gear carried by said shaft, a gear adapted to be secured to the saw shaft, and means for inter-connecting said gears in all positions of the saw supporting means.

38. A machine for gumming saws comprising movable means for supporting a saw shaft, a power shaft, a gear fast on said shaft, a gear normally attached to said saw shaft, an arm pivoted upon said power shaft, a pinion carried by said arms and meshing with both of said gears, and means for moving said arm in consonance with movements of said shaft supporting means whereby to maintain the operative relationship of said gears and pinion in all positions of the supporting means.

39 A machine for gumming saws comprising movable means to support a saw shaft, a power shaft, a gear mounted thereon, a gear provided with an elongate hub secured to the saw shaft, an arm pivoted to swing upon said power shaft, a pinion mounted upon the arm and normally meshing with both of said gears, a link pivotally secured to said arm, and a member carried by said link and normally engaging the hub of the saw shaft gear whereby to prevent disengagement of the pinion from said latter gear during movement of the shaft supporting means.

40. A machine for gumming saws comprising movable means for supporting a saw shaft for bodily movement transverse of its axis, power means comprising a train of gear wheels for turning said shaft, and means for preventing disengagement of the gears of said train during the bodily movement of such shaft, said latter means being constructed and arranged to permit disengagement of said gears at will.

41. A machine for gumming saws comprising movable means for supporting a saw shaft for movement into and out of operative relation to gumming means, a power shaft, a gear thereon, a gear for attachment to a saw shaft, said gear having an elongate hub, an arm pivoted upon said power shaft, a pinion carried by said arm and meshing with both of said gears, a link pivotally secured to said arm, and a lug adjustably secured to the link and engageable over the hub of the saw shaft gear.

42. A machine of the class described comprising a horizontally slidable support for a saw cylinder, a lever for moving said support, and connections interposed between the lever and support so constructed and arranged that when at one limit of its movement the support is locked against direct pressure tending to move it toward its opposite limit of movement.

43. A machine of the class described comprising a slidable support for a shaft, a pivoted lever, a rocker device having oppositely extending arms, a link connecting the lever to the forward arm of the rocker, and a second link connecting the rear arm of the rocker with the support, the points of connection of the latter link with the rocker arm and support respectively lying substantially in alignment with the axis of the rocker when the support is in operative position.

Signed by me at Bridgewater, Massachusetts, this 13th day of July 1922.

ROBERT W. McLEAN.